Oct. 4, 1938.  A. H. J. DE L. SAINT GENIES  2,131,974

SCREEN FOR THE PRODUCTION OF STEREOSCOPIC IMAGES

Filed March 22, 1935   3 Sheets-Sheet 1

INVENTOR.
Anne Henri Jacques
de Lassus Saint Genies
BY
Stone, Boyden & Mack
ATTORNEYS.

Oct. 4, 1938.   A. H. J. DE L. SAINT GENIES   2,131,974
SCREEN FOR THE PRODUCTION OF STEREOSCOPIC IMAGES
Filed March 22, 1935    3 Sheets-Sheet 2
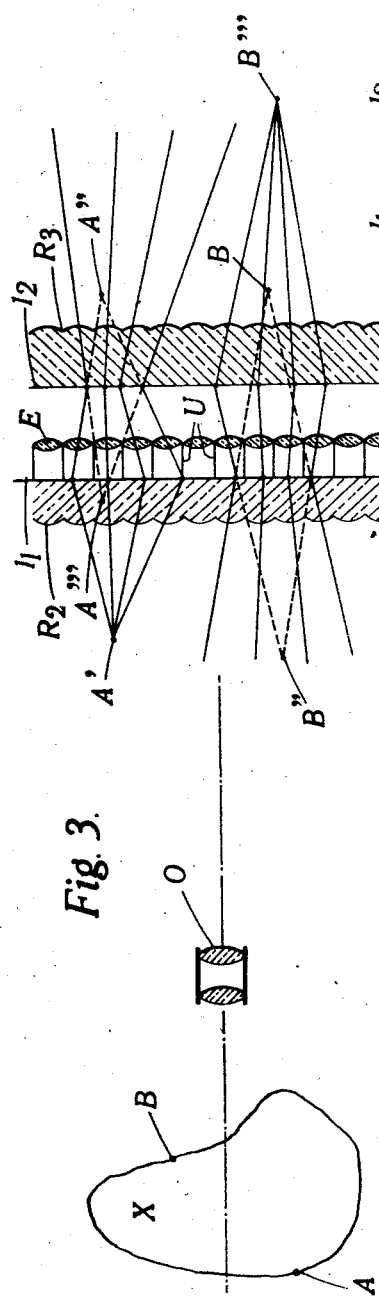
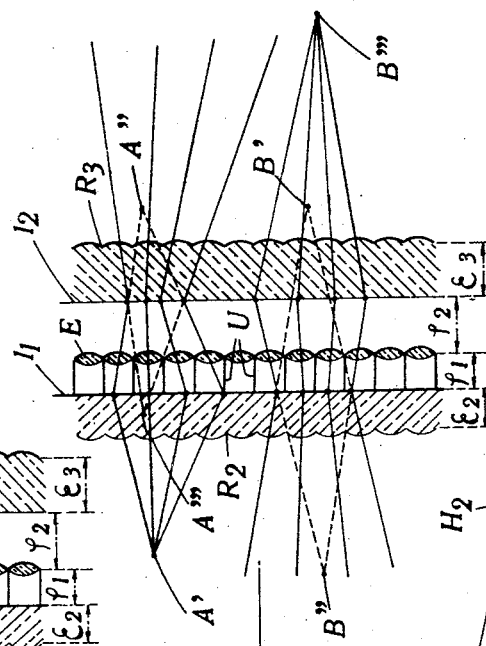
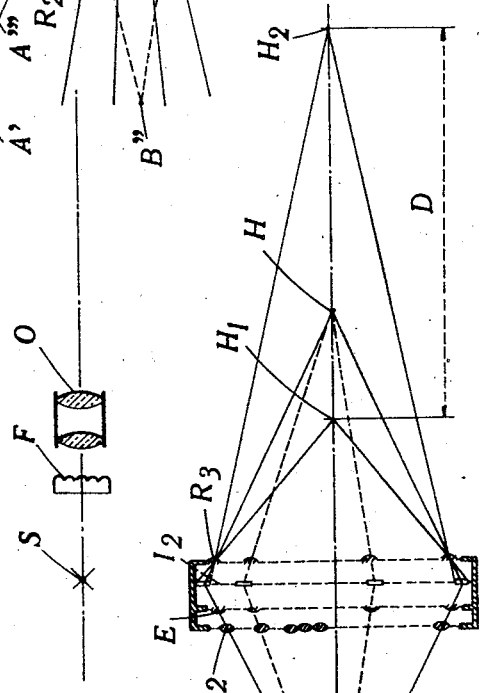

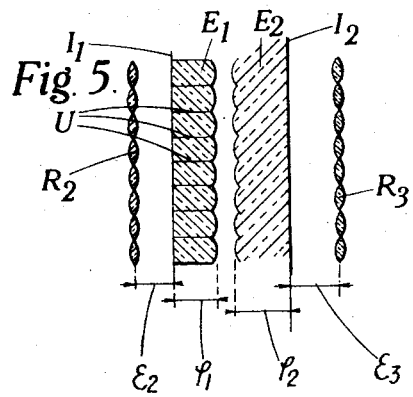
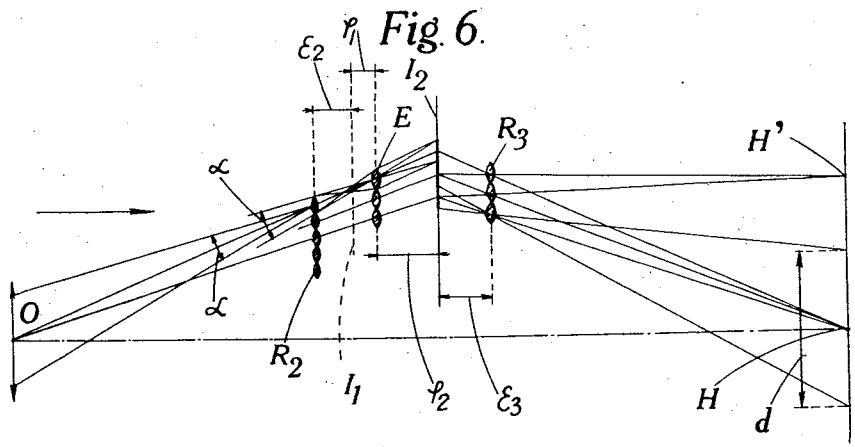
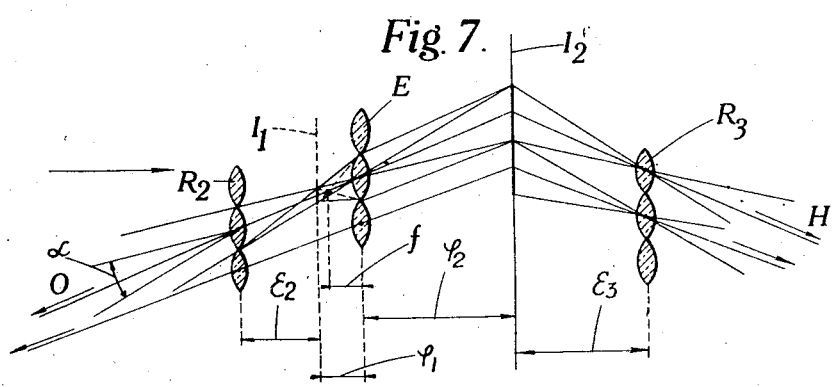

Patented Oct. 4, 1938

2,131,974

UNITED STATES PATENT OFFICE 2,131,974

SCREEN FOR THE PRODUCTION OF STEREOSCOPIC IMAGES

Anne Henri Jacques de Lassus Saint Genies, Versailles, France

Application March 22, 1935, Serial No. 12,511
In France March 24, 1934

3 Claims. (Cl. 88—24)

The present invention relates to means for producing stereoscopic images.

One object of the invention consists in an improved means for the stereoscopic projection of three-dimensional objects and of lined or lenticular films or plates.

A further object of the invention consists in the production of stereoscopic images, starting from three-dimensional objects or lined or lenticular films or plates, by projection on special screens comprising goffered refractive networks, the said screens being adapted to produce, by reflection or by transparency, stereoscopic images which may be viewed from suitable positions by one or more observers.

A further object of the invention consists in improvements in the construction of projection screens suitable for viewing, by reflection or by transparency, stereoscopic images produced thereon by projection.

The invention will be more clearly understood from the detailed description of several typical embodiments thereof, which description is given hereinafter, by way of example, with reference to the accompanying drawings, and will be defined more particularly in the appended claims.

In the drawings:

Fig. 3 represents means in accordance with the present invention for producing a picture in relief and of changing aspect of a primary subject of three dimensions, said means including a transparent screen.

Fig. 4 represents means in accordance with the present invention for projecting a picture in relief and of changing aspect recorded on a lenticular film, said means including a transparent screen.

Fig. 5 shows a modification of the screen shown in Figs. 3 and 4.

Figs. 6 and 7 illustrate diagrammatically a modified form of the screen for observation by transparency, together with the path of the light rays therethrough.

Fig. 8 represents diagrammatically the use of an embodiment of the invention in a picture theatre.

Figure 1:
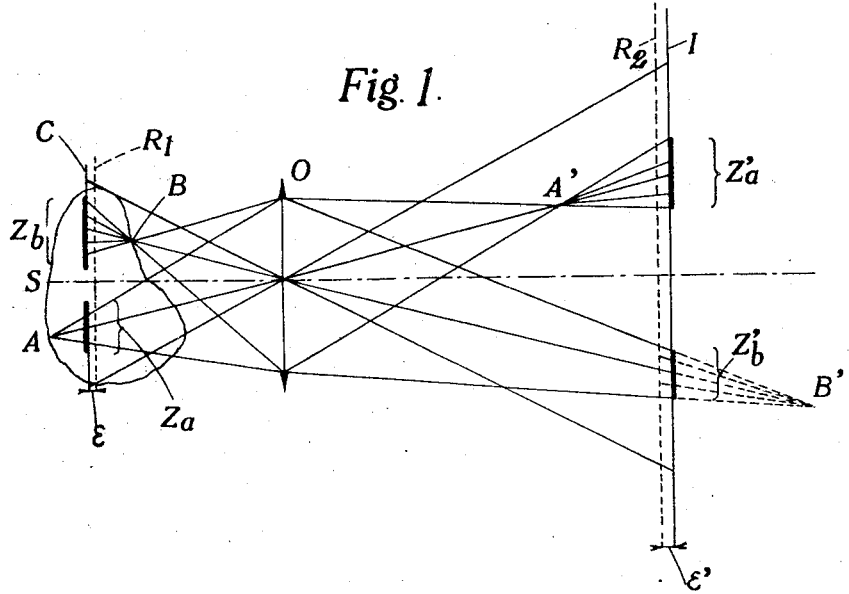
Fig. 1 represents diagrammatically the conditions of projection of a film or plate provided with a suitable optical network onto a projection screen also provided with a refracting optical network, the stereoscopic image produced being viewed by reflection.

With reference to Fig. 1, the plate or film C to be projected comprises an optical network $R_1$, which is lined or lenticular and at a distance $e$ from the emulsion surface of the film or plate; in the case of goffering, the distance $e$ corresponds to the focal distance of the latter. O is the optical projection system, I the plane of projection of the screen, which is preferably conjugate with the plane C. S is a suitable light source for projection and $R_2$ a lined or lenticular network placed in front of the screen I.

It is supposed that the film or plate C, when viewed directly, produces with its optical network $R_1$ a stereoscopic aerial image. Such films or plates are well known and do not form part of the invention per se.

If A and B are any two points of this aerial image, they are materialized on the film or plate C by a plurality of small areas distributed at regular intervals over the zones $Z_a$ and $Z_b$. The sum of a part only of the light rays emanating from these multiple areas and directed respectively, one by one, by the openings or by the diopters of the network $R_1$, may be refracted by the optical projection system O and produce, on the plane I of the screen, a plurality of areas distributed over the zones $Z'_a$ and $Z'_b$. It is evident that if the network $R_2$ coincides, as far as is possible in practice, with the conjugate image of $R_1$, the distance $e'$ will be in a ratio with $e$ which is substantially equal to the magnification of the projection.

An observer placed in front of the screen I, on the side of its network $R_2$, may then perceive an image A' B' formed by the light rays reflected by this screen, that is to say a stereoscopic image. It will be understood that to this end, an elementary area of the zone $Z'_a$, for example, must never be seen simultaneously by the two eyes of the observer, that is to say that the elementary light rays must be in sufficiently large number and sufficiently narrow, and that in this complex transmission networks composed of joined diopters or picots are more satisfactory than lined networks.

On the other hand, it is preferable to make the pitch of the network $R_2$ finer than that of the conjugated image of the network $R_1$ given by the optical system O, while conserving as far as possible the same opacity, that is to say the same ratio between the opaque parts and the transparent parts of the network.

If an infinite number of light beams emanate from any point A, it is no longer necessary to make the plane I coincide with the conjugated plane of C, for under these conditions there corresponds for all positions of I a conjugated plane which sections the aerial image given by the film or plate. The same observation applies to the projection of a real object.

It will be noticed that the arrangement of Fig. 1 gives an inverted stereoscopic image and that moreover the right and left are interchanged. In order to obtain the correct right and left, it is sufficient to employ a correcting prism or mirror in known manner or to take similar known precautions and measures during the printing of the original film or plate or of the copies thereof.

In the projection of Fig. 1, in order to see the correct relief of a subject photographed in relief, it is necessary to project a film or plate giving an inverted relief by direct vision.

Figure 2:
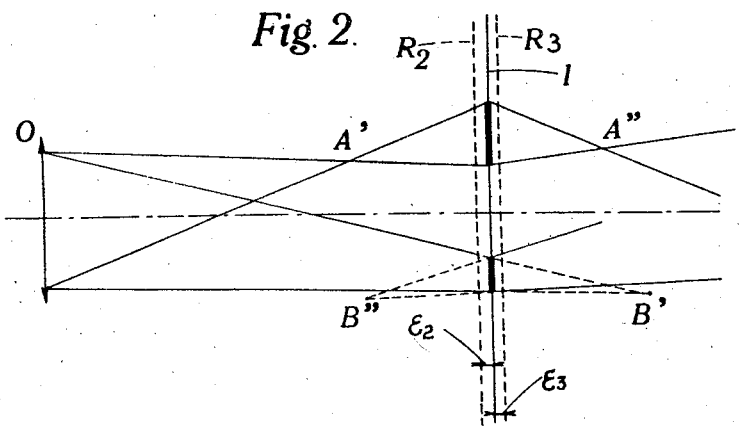
Fig. 2 illustrates diagrammatically the projection of a similar film or plate to that of Fig. 1 onto a screen comprising a plurality of networks which permits of vision by transparency.

Fig. 2 represents a modification of the invention wherein the screen is observed by transparency. Its plane I is an unpolished surface. $R_3$ is an optical network similar to $R_2$, having the same or nearly the same pitch, arranged on the other side of the plane I relatively to $R_2$. For observers looking at I from the side of $R_3$, the points $A''$ and $B''$ will be substituted for the points $A'$ and $B'$. The position of these points $A''$, $B''$, etc. depends on the ratio of the distances or focal lengths $c_2$ and $c_3$, but it will be understood that it is again inverted relief that is seen and that in order to avoid this it is again necessary to project a film or plate giving inverted relief by direct vision.

The present invention overcomes this disadvantage. Referring to Fig. 3, X is the primary subject of three dimensions of which a picture in relief is to be produced. O is an optical projection system.

$R_2$ and $R_3$ are two lined or goffered networks and $I_1$ and $I_2$ are two unpolished planes separated by a goffered or lined optical network or screen E adapted to give, on $I_2$, images which are homothetic of those produced by $R_2$ on $I_1$. The ratio of the sizes of the elementary images on $I_1$ and $I_2$ corresponds to the ratio of the distances $\varphi_1$ and $\varphi_2$.

Fig. 4 shows a modification of the apparatus illustrated in Fig. 3 for projecting a lenticular film. S is a source of light, F the lenticular film on which is recorded a picture in relief and O is the optical projection system. The screen is similar to that described with reference to Fig. 3.

Fig. 5 represents a modification of the screen of Figs. 3 and 4. The network E is divided into two component parts $E_1$ and $E_2$ comprised between $I_1$ and $I_2$, the cross-hatched portions being of transparent material having an index of refraction greater than 1.

In order to ensure the correspondence of the elementary images one by one in the arrangements of Figs. 3, 4 and 5, it is generally necessary to provide opaque divisions U between the optical elements of the network E, at least on one side of its mean plane. The observer sees the aerial images $A'''$, $B'''$, etc. (see Fig. 3) of the points A and B, etc., that is to say the correct relief, the depth of which depends on the values of $c_2$ and $c_3$ as well as on the values $\varphi_1$ and $\varphi_2$ and on the characteristics of the optical projection system.

According to Figs. 6 and 7, the construction of the screen may be simplified and the opaque divisions U dispensed with. In these figures, the luminous beams emerging from the largest emergent pupil of O and forming a maximum angle $\alpha$, after having traversed the elements of the network $R_2$ do not pass outside the limiting surfaces of the elements of the network E, which correspond optically one by one to the optical elements of $R_2$. On the other hand, they form on the unpolished surface $I_2$ elementary images which also do not overlap. The unpolished plane $I_1$ may be dispensed with. Finally, as represented in Fig. 6, it is necessary that the elements of the network $R_3$ correspond optically one by one to these elementary images formed on $I_2$.

The networks have been supposed to be lenticular, but they may also be cylindrical or lined. The network $R_3$ gives in the plane H, H' a great number of adjacent images separated one from the other by the maximum emergent pupil of the objective O as seen from the surface of $R_2$. These images are distributed around the central image d, the centre of which is on the principal optical axis OH, the distribution and configuration of these images depending on the distribution and the nature of the optical elements on $R_3$ and of the magnitude of $\alpha$.

It will be understood that from any point of view within the periphery of each of these images, the observer will see the same variable aspect of the subject projected which he would have of the subject itself seen from the optical system O. The farther he gets away from the centre H, and when in the position H' for example, the more will he experience a deformation of the perspective of the subject. It will also be understood that the observer will still find suitable points of view, for the whole or part of the subject, in front of or behind the plane H.

Motion picture films with correct relief may be projected on the screens of Figs. 3 and 6. If the relief is inverted, they may be projected on screens of the type of Fig. 2.

Fig. 8 shows diagrammatically how the invention may be used in a picture theatre. In this figure S is a light source, F the lenticular film which is to be projected, O the optical projecting system, $R_2$, E, $I_2$, and $R_3$ components of the screen corresponding for example to Fig. 6. The observers should preferably be placed in the range D between the points $H_1$ and $H_2$. These points correspond to the intersections of the rays emitted from the extremities of the outermost images formed on the unpolished plane $I_2$ and passing through the outermost elements of the lenticulation of the network $R_3$. The point H corresponds to the intersection of the rays from the centres of the same images and indicates the best position for placing the observers of the relief images.

Consequently, the pitches of the three networks necessarily differ from one another and also differ from the pitch of the elementary images formed on the unpolished plane $I_2$.

I claim:—

1. A transparent screen system for use in association with an optical projecting device for producing a picture in relief of a three-dimensional primary subject which system comprises at least three lenticular networks formed of a large number of small lenses of short focal lengths and of the same order, and at least one unpolished screen surface, one of said lenticular networks being arranged between the observers and the unpolished surface, and two of said lenticular networks being arranged between the said unpolished surface and a projecting device, the lenses of one of said two lenticular networks corresponding in number optically to those of the other of said networks, the corresponding lenses of each network being in alinement with the optical center of the objective of the projecting device, the pitch of the lenses of the network adjacent the unpolished surface being sufficiently greater than the pitch of the network facing the projecting device so that the images projected by the former onto said unpolished surface are enlarged as contrasted to the images formed by the lenses of the latter, the network adjacent the unpolished screen surface having one focal plane at the said surface and the other focal plane at the rear focal plane of the front network, the two networks cooperating to produce on the unpolished surface elementary real neighbouring images of the exit pupil of the projecting objective, the third network being arranged on the side of the unpolished surface remote from the projecting device at a distance from said unpolished surface equal to the focal length of the lenses of the said network, the lenses of said third network corresponding in number optically with the images on the unpolished screen surface and being alined with corresponding images and a selected common point, the said network being adapted to form virtual images of each of said images and to collimate said virtual images to observers on the same side of the unpolished screen surface.

2. A screen system for use in association with an optical projecting device for producing a picture in relief of a three-dimensional primary subject which system comprises at least three lenticular networks formed of a large number of small lenses of short focal lengths and of the same order, and at least one unpolished screen surface, one of said lenticular networks being arranged between the observers and the unpolished screen surface, two of said lenticular networks being arranged between the said unpolished screen surface and a projecting lens, the lenses of one of said two lenticular networks corresponding in number optically to those of the other of said networks, the pitch of the lenses of the network adjacent the unpolished screen surface being greater than the pitch of the network facing the projecting device, the corresponding lenses of the networks and projecting lens being alined, the network nearest the projecting device having lenses for forming small separated partial images of the exit pupil of the projecting objective in a plane conjugate with the unpolished surface with respect to the second network, and said second network having magnifying lenses for forming enlarged images of said small images on said unpolished surface.

3. Means for projecting a picture in relief and of changing aspect recorded on a lenticular film comprising in combination an optical projection system having an objective and a screen, said screen comprising a first unpolished surface and a second unpolished surface on the side of the first surface remote from the optical projection system, a first lenticular network on the side of said first unpolished surface facing the optical projection system, a second lenticular network between the two unpolished surfaces, and a third lenticular network on the side of the second unpolished surface remote from the first unpolished surface, said unpolished surfaces being conjugated with respect to said second lenticular network, the optical elements of said first and said second lenticular networks corresponding in number and alined with the objective of said projection system for forming elementary real separated partial image elements of the picture in relief on the first unpolished surface by the first lenticular network and enlarging and projecting them as contiguous image elements on the second unpolished surface of said second network, the third lenticular network having converging lenses placed at a distance from said second unpolished surface equal to the focal length of the lenses of said third network, the lenses being alined with said picture elements and a common point for forming virtual images of each of said real images on said second unpolished surface and collimating said virtual images to observers on the side of the screen remote from said optical projection system.

ANNE HENRI JACQUES DE
LASSUS ST. GENIES.